Dec. 2, 1952  D. A. V. ANDERSSON  2,620,052
POSITIVE CLUTCH
Filed Nov. 28, 1949
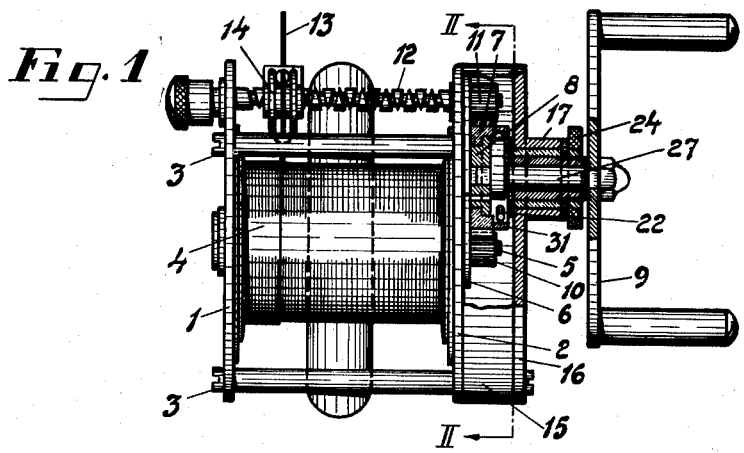
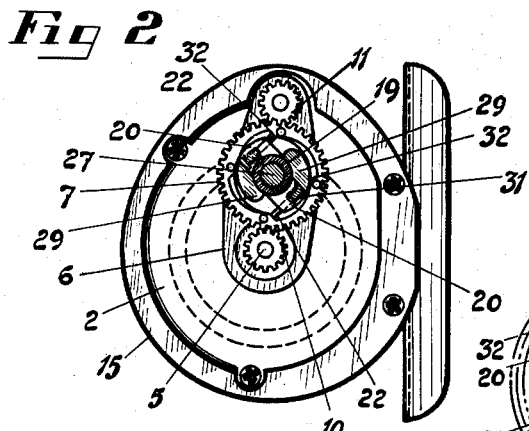
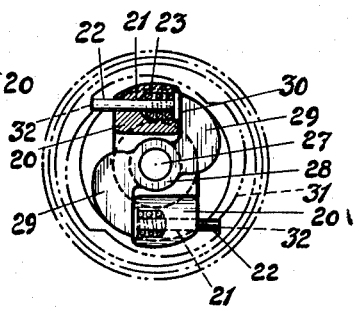
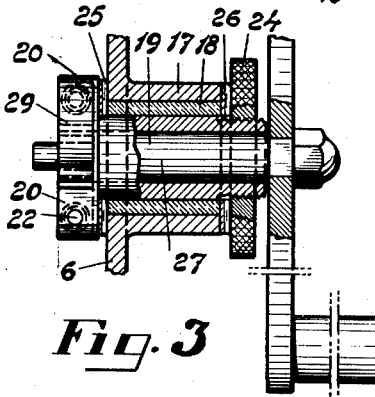
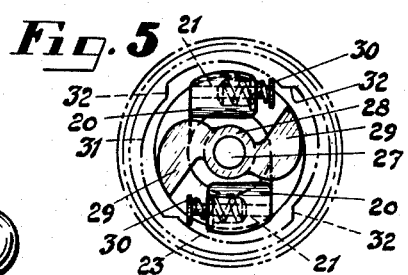
INVENTOR.
DONALD ASSAR VILHELM ANDERSSON
BY
Linton and Linton
ATTORNEYS Patented Dec. 2, 1952

2,620,052

UNITED STATES PATENT OFFICE 2,620,052

POSITIVE CLUTCH

Donald Assar Vilhelm Andersson, Gothenburg, Sweden, assignor to Malte Pontus Blohm, Gothenburg, Sweden Application November 28, 1949, Serial No. 129,735
In Sweden February 3, 1947

3 Claims. (Cl. 192—46)

The present invention relates to free-spool fishing reels of the kind comprising a rotatably mounted winding spool and a rotatably mounted hand crank, the rotary movement of which is transmitted to the spool by means of a releasable coupling comprising on one hand a first coupling member rotatable by the crank and provided with a number of dogs in the path of movement of which, when the crank is rotated in order to wind up the fish line, there are disposed the ends of a corresponding number of co-acting elements movably mounted on a carrier rotatably and frictionally mounted on a shaft co-axial with the axis of rotation of said first coupling member, and on the other hand a second coupling member rotatable with the spool and rotatably mounted on a shaft co-axial with the axis of rotation of the first coupling member, said second coupling member being provided with surfaces adapted to co-operate with the aforesaid co-acting elements when these are in an operative position. More particularly the invention relates to fishing reels of the kind referred to in which the movement of rotation of the first coupling member rotatable by the crank is transmitted to the second coupling member coupled to the spool by means of said co-acting elements as the crank is rotated in one direction, while when the crank is released the spool is free to rotate to the opposite direction without transmitting its movement to the crank.

The object of the invention is to provide a fishing reel of the kind referred to which is simple in its construction and reliable in its action.

The invention is mainly characterized in that the said co-acting elements adapted to transmit the movement of the first coupling member to the second coupling member consist of pins slidable substantially tangentially to an imaginary circle concentric with the coupling members.

According to a suitable embodiment the pins are actuated by springs which normally tend to slide the pins out of engagement with the co-operating surfaces of the second coupling member rotatable with the spool.

An embodiment of the invention is shown by way of example on the accompanying drawing, wherein—

Figure 1 is a front elevation of a reel partly in section and with some portions cut away.

Figure 2 shows certain movement transmitting members shown in the direction of the arrows II—II in Figure 1.

Figure 3 is a section on a somewhat enlarged scale through the portion of the mechanism shown to the right in Figure 1, and Figures 4 and 5 show the parts of the coupling in different working positions and viewed oppositely to the direction of Figure 2.

In the drawing 1 and 2 denote two parallel, spaced plates interconnected by means of screws 3. Between these plates the spool for the fishing line is carried by a shaft 5 journalled in bearings fixed to the plates. To the outer side of the plate 2 there is secured a smaller plate 6, and outside this plate there is provided a toothed wheel 7 rotationally mounted on a hub 8 and adapted to be rotated through an intermediate coupling (hereinafter described) by a hand crank 9 mounted on a crank shaft 27. A small pinion 10 fixed to the spool shaft 5 meshes with the toothed wheel 7 so that the spool is caused to rotate when the toothed wheel 7 is rotated. Another pinion 11 secured to a screw 12 journalled in the plates 1, 2 also meshes with the toothed wheel 7, and on said screw 12 there is mounted a levelling winding carriage 14 of common form.

The toothed wheel 7, the pinions 10 and 11 and the aforesaid coupling are situated in a chamber formed by a rim 15 and a cover 16 secured to the plate 2 by means of screws.

In front of the hub 8 the cover 16 is formed with a cylindrical projection 17 and in a bushing 18 secured in said projection there is rotationally mounted a sleeve 19 the inner end of which is formed with two radially projecting heads 20 positioned diametrically opposite each other. These heads are each formed with a channel 21 disposed mainly tangentially to an imaginary circle concentric with the crankshaft 27 and the said sleeve 19, and in each channel there is slidable a pin 22 actuated by a spring 23 normally tending to keep the pin in the position shown in Figure 5. The outer end of the sleeve 19 is screw-threaded and has a nut 24, and by tightening said nut the heads 20 can be caused to frictionally contact a ring 25 of a suitable material secured between the heads and the inner side of the cover 16. A similar ring 26 is provided between the nut 24 and the end surface of the projection 17. In the sleeve 19 there is journalled the crankshaft 27 to the outer end of which the hand crank 9 is secured, and to the inner end of the crankshaft there is secured a hub 28 formed with two radially projecting wings 29 disposed diametrically opposite each other. In the path of movement of said wings, as the hand crank is rotated in a clockwise direction with respect to Figure 2 the enlarged ends 30 of the pins 22 are disposed. As the crank 9 is rotated the wings 29 abut the ends 30 of the pins 22 and slide the pins 22 from the position shown in Figure 5 to the position shown in Figure 4, whereupon the wings cause the heads 20 and the sleeve 19 to rotate with them. As soon as the crank is released the springs 23 slide the pins 22 back to the position shown in Figure 5 whereby the wings 29 and the crank 9 have imparted to them a slight backward movement. To the side of the toothed wheel 7 facing towards the cover 16 there is secured a sleeve 31, which surrounds the heads 20 and the wings 29, and is internally formed with a suitable number (according to the embodiment shown, four) evenly spaced sloping step surfaces 32 which, when the pins 22 occupy the position shown in Figure 4, are in the path of movement of the ends of the pins opposite the enlarged ends 30 and co-operate with same so that the sleeve 31 and thus the toothed wheel 7 are caused to rotate as the crank 9 is rotated. With the coupling described the spool 4 is imparted a winding up rotation as the crank 9 is rotated in a clockwise direction with respect to Figure 2, while, when releasing the crank, the crank and the spool are automatically disconnected from each other, so that the rotation of the spool is not transmitted to the crank when a cast is made.

The invention is not limited to the embodiment described above and shown in the drawing but may be varied in details without departing from the spirit. For instance the springs 23 can be dispensed with, and in such a case the coupling disengages the connection between the spool and the crank at the beginning of the unwinding movement of the spool when a cast is made, as the sloping step surfaces 32 of the sleeve 33 push the pins 22 out of engagement with themselves, imparting to the wings 29 and to the released crank 9 a slight movement in the anti-clockwise direction.

What I claim is:

1. A one-way clutch for fish reels having a driving shaft and a driven shaft for rotating the line winding reel thereof comprising a sleeve rotatably mounted on said driving shaft, a pair of diametrically opposite heads mounted on said sleeve, a plurality of pins, each of said heads having a channel formed therein in a substantially tangential direction with reference to an imaginary circle concentric with said driving shaft and each of said pins being slidably mounted in one of said channels, a plurality of springs each mounted on one of said heads and tending to withdraw an end of the respective pin into said head, a coupling connected to said driven shaft for rotation therewith and being coaxially positioned with said driving shaft, said coupling member having a plurality of surfaces formed therewith for receiving said pins and connecting said heads with said coupling for rotation together and means for moving said pins against said coupling surfaces against the action of said springs upon rotation of said driving shaft.

2. A one-way clutch for fishing reels having a driven shaft for rotating the line winding reel thereof comprising a tubular bearing mounted on the fishing reel, a tubular sleeve rotatably mounted in said bearing, a pair of diametrically opposite heads mounted on said sleeve, each of said heads having a channel formed therein in a substantially tangential direction with reference to an imaginary circle concentric with said sleeve, a pair of pins each slidably mounted in one of said head channels, a pair of springs each mounted on one of said heads and tending to withdraw an end of the respective pin into said head, a driving shaft rotatably mounted through said sleeve, a pair of diametrically opposite wing members carried by said shaft and arranged for moving said pins against the action of said springs upon rotation of said driving shaft in one direction, and a second sleeve connected to said driven shaft for rotation therewith and having a plurality of spaced sloping step surfaces for receiving said pins when moved against said springs and rotating said sleeves together.

3. A one-way clutch as claimed in claim 2 wherein said first mentioned sleeve has a threaded end, a screw nut mounted in threaded engagement with the threaded end of said sleeve, a pair of rings mounted on said sleeve with one between said head and said bearing and the other between said nut and said bearing for adjusting the frictional contact between these members.

DONALD ASSAR VILHELM ANDERSSON.

REFERENCES CITED

The following references are of record in the file of this patent:

UNITED STATES PATENTS

| Number | Name | Date |
|---|---|---|
| 215,378 | Lorey | May 13, 1879 |
| 929,867 | Meisselbach et al. | Aug. 3, 1909 |
| 1,096,781 | Erickson | May 12, 1914 |
| 1,421,183 | Ditson | June 27, 1922 |
| 1,610,794 | Keller, Sr. | Dec. 14, 1926 |
| 2,163,030 | Gehr | June 20, 1939 |

FOREIGN PATENTS

| Number | Country | Date |
|---|---|---|
| 622,960 | France | Mar. 8, 1927 |